Oct. 12, 1926.
M. HENDRICKSON
MOTOR TRUCK
Filed Sept. 26, 1925    2 Sheets-Sheet 1
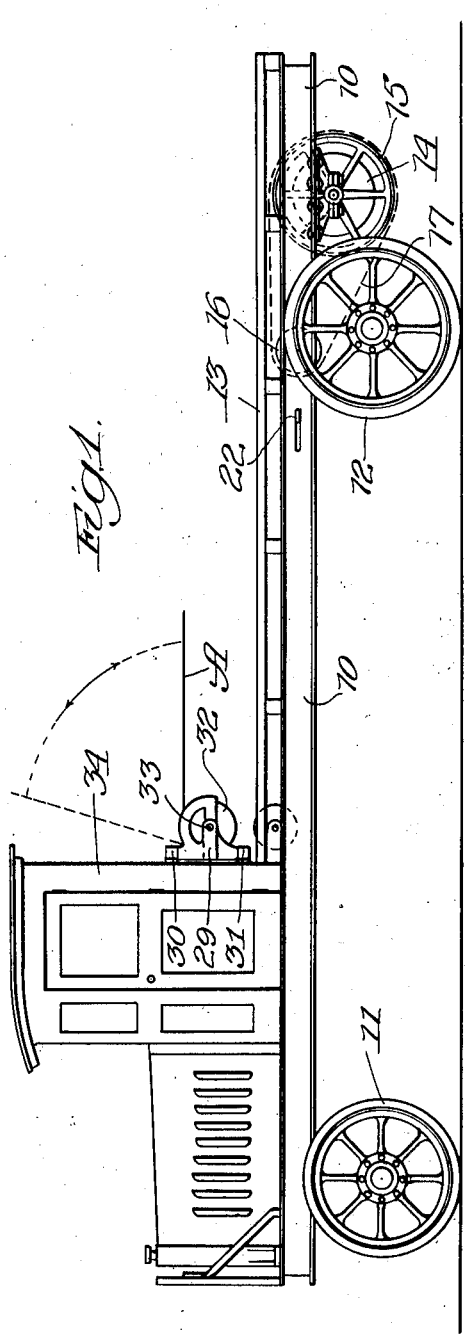
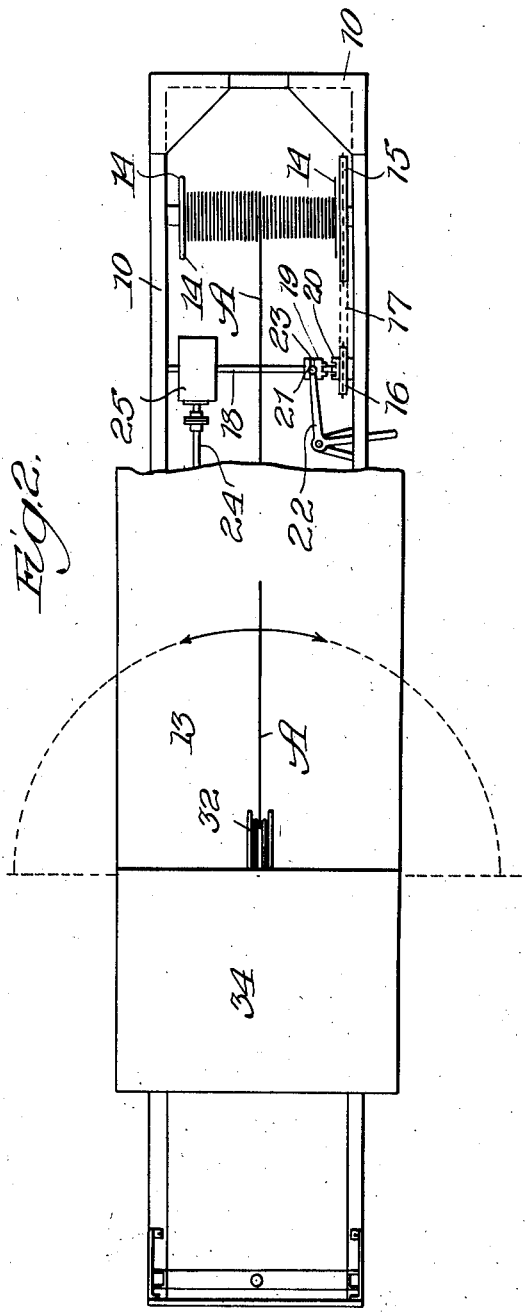
Inventor:
Magnus Hendrickson, Oct. 12, 1926.  1,602,974
M. HENDRICKSON
MOTOR TRUCK
Filed Sept. 26, 1925    2 Sheets-Sheet 2
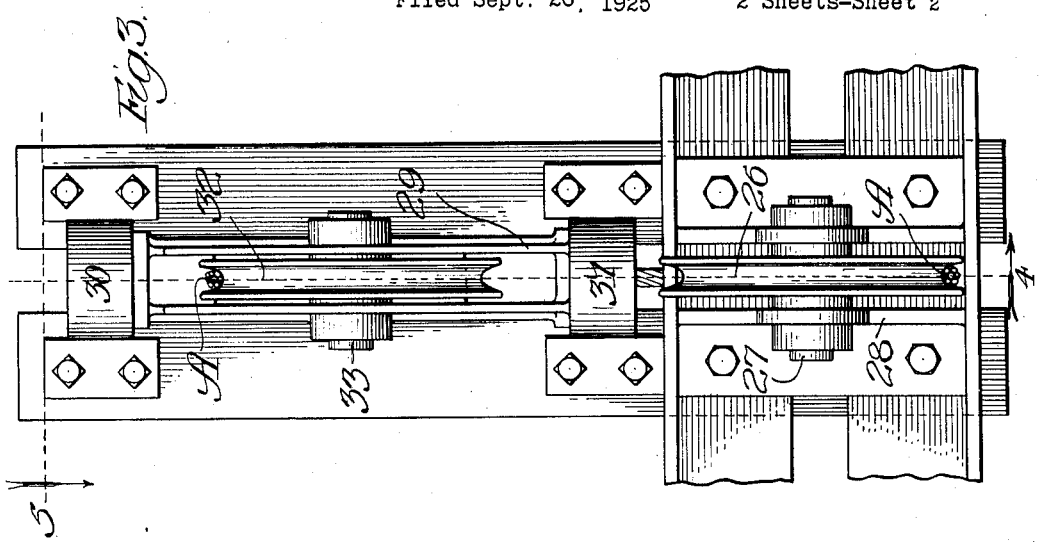
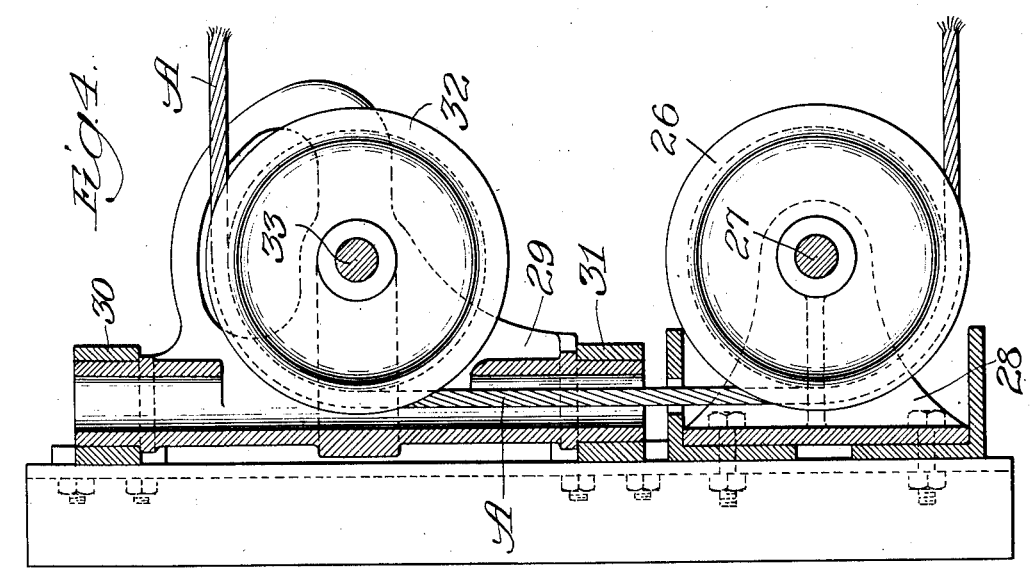
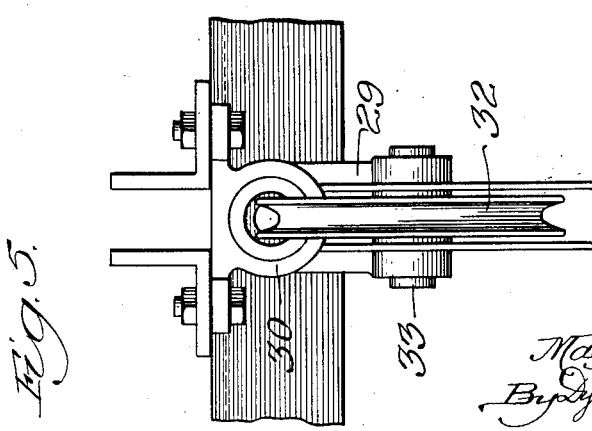
Inventor:
Magnus Hendrickson, Patented Oct. 12, 1926.

1,602,974

UNITED STATES PATENT OFFICE.

MAGNUS HENDRICKSON, OF CHICAGO, ILLINOIS.

MOTOR TRUCK.

Application filed September 26, 1925. Serial No. 58,793.

This invention relates to motor trucks and the like and particularly to tower hoists for the same and is fully described in the following specification and shown in the accompanying drawings, in which, Figure 1 is a side elevation of the truck embodying the invention, Fig. 2 is a top plan view of the same showing part of the truck body cut away, Fig. 3 is an enlarged front elevation of a castering sheave used on the truck, Fig. 4 is a side elevation of the same, and Fig. 5 is a partial plan view of the sheave and mounting as viewed from the line 5 of Fig. 3.

The embodiment illustrated comprises a truck having a chassis 10 which is driven by a motor (not shown) in a well known manner, said truck having front and rear wheels 11 and 12 respectively.

Any suitable platform 13 may be used beneath which is rotatably mounted a drum 14 to which is secured a large sprocket wheel 15 which is driven by a small sprocket wheel 16 by means of chains 17.

The sprocket 16 is journalled on a shaft 18 which in turn is suitably journalled on the chassis, said shaft having a dental clutch element 19 splined thereon so as to rotate with the shaft but movable longitudinally thereof into and out of engagement with corresponding dental teeth 20 on the hub of the sprocket 16. A pin 21 on the end of the bell crank 22 operates in the groove 23 in the member 19 to move the dental clutch element into and out of engagement with the teeth 20.

Thus it will be seen that with the shaft 18 continuously driven, the operator may throw the clutch 19 into engagement with the sprocket 20 thereby driving the drum 14 through the sprocket wheel 15 and, when desired, the clutch member 19 may be again thrown out of engagement.

The shaft 18 is driven by the shaft 24 which is operably connected to the engine by mechanism not shown, so that the shaft 24 may be driven by the truck motor when desired. The shaft 24 drives the shaft 18 by any suitable form of gears such as a worm wheel (not shown) but contained in the gear case 25.

The steel rope A which is wound on the drum 14 passes forward to the sheave 26 as shown in Figs. 3 and 4, said sheave being journalled on a pin 27 which is carried by a bracket 28. Above the sheave 26 is placed a hollow sheave housing 29 which is journalled at the top and bottom in suitable bearings 30 and 31. A sheave 32 is journalled on a pin 33 in the sheave housing 29.

The rope A passing up from the sheave 26 passes through the hollow lower portion of the castering element 29 and around the sheave 32 and from here may be led to the rear or to either side through a swing of substantially 180° horizontally and at the same time may be led up or to the rear through a vertical angle of substantially 90° from the horizontal.

The sheave housing 29 is preferably placed upon the rear of the cab 34 and, in this position, can be turned so as to lie quite flat against the back of the cab when not in use, thereby occupying a minimum of space and interfering as little as possible with any load which may be placed on the truck bed 13.

Thus it will be seen that a very simple and highly efficient form of truck hoist is provided.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a motor truck, a chassis, a drum, a rope on said drum, means for driving said drum to wind the rope thereon, a cab on said chassis, a mounting on the back of said cab, a sheave housing journalled at two points in said mounting, a sheave journalled in said housing and adapted to receive said rope and to permit the end passing therefrom to take-off through a wide angle, said housing being movable so as to lie substantially flat against said cab.

2. In a motor truck, a chassis, a drum, a rope on said drum, means for driving said drum to wind the rope thereon, a cab on said chassis, a mounting on the back of said cab, a sheave housing journalled at two points in said mounting, a sheave journalled in said housing intermediate said bearing points and at one side thereof and adapted to receive said rope and to permit the end passing therefrom to take-off through a wide angle, said housing being movable so as to lie substantially flat against said cab.

MAGNUS HENDRICKSON.